(12) United States Patent
Rosser et al.

(10) Patent No.: US 6,739,351 B1
(45) Date of Patent: May 25, 2004

(54) DISSOLVABLE PRODUCT FEED APPARATUS

(75) Inventors: David E. Rosser, Lansdale, PA (US); William J. Beer, Harleysville, PA (US)

(73) Assignee: GE Betz, Inc., Trevose, PA (US)

( * ) Notice: Subject to any disclaimer, the term of this patent is extended or adjusted under 35 U.S.C. 154(b) by 0 days.

(21) Appl. No.: 10/308,475

(22) Filed: Dec. 3, 2002

(51) Int. Cl.⁷ .............................................. E03C 1/046
(52) U.S. Cl. ........................................ 137/268; 138/45
(58) Field of Search ........................ 137/268; 138/45; 422/264, 278

(56) References Cited

U.S. PATENT DOCUMENTS

| | | | | |
|---|---|---|---|---|
| 3,444,897 A | * | 5/1969 | Erickson | .................... 138/45 |
| 3,752,183 A | | 8/1973 | Griswold | |
| 4,609,014 A | * | 9/1986 | Jurjevic et al. | ................ 138/45 |
| 5,713,483 A | | 2/1998 | Ata et al. | |
| 5,855,355 A | | 1/1999 | Grunert et al. | |
| 5,928,608 A | * | 7/1999 | Levesque et al. | ....... 422/264 X |

OTHER PUBLICATIONS

Houghton Chemical Corporation Product Information Web Pages (Great Lakes Water Treatment).
Bulk Systems Inc. Product Information Web Pages (Big Bro).

* cited by examiner

Primary Examiner—Kevin Lee
(74) Attorney, Agent, or Firm—Duane Morris LLP

(57) ABSTRACT

According to one embodiment of the present invention, a dissolvable product feed apparatus for dissolving a feeding dissolvable product includes a dissolvable product holding vessel and an automatic flow control device fluidly connected to the holding vessel.

8 Claims, 3 Drawing Sheets

DISSOLVABLE PRODUCT FEED APPARATUS

FIELD OF THE INVENTION

The present invention relates to an apparatus for use in feeding dissolvable products, and in particular, an apparatus, such as a brominator, having improved flow control.

BACKGROUND OF THE INVENTION

Apparatuses for holding and feeding dissolvable products are generally known. For example, brominators, which dissolve and feed granulated brominated hydantoin, are currently used in water treatment systems to control bacterial, algal and fungal populations. One such known brominator 200 is depicted in FIG. 1.

Brominator 200 includes a chemical holding tank 202, an outlet system 206, a diffuser 208, and an inlet system 210. Inlet system 210 includes a flowmeter 212 and a ball valve 214. Outlet system 206 includes a ball valve 216. A granulated bromine product is contained within the tank. Water is fed into the tank through the inlet system and enters into the bottom of the tank. When the water pressure increases going into the tank, or when a pressure drop occurs between the inlet system and outlet system, the water flow rate into the tank increases. This often causes the granulated product to lift or"float" above the bottom of the tank and up to the diffuser (or screen). As a consequence of this floating, the diffuser or screen may become clogged and/or small undissolved granules may undesirably go through the diffuser or screen. It is generally necessary to include a relief valve for relieving excess pressure due to clogging or other causes of pressure build-up.

In the brominator 200, the water flow is regulated by ball valves 214 and 216 of the inlet system 210 and outlet system 206. Although the ball valves may be throttled to some extent to control flow and adjust for pressure fluctuations, this requires a manual operation and does not allow for continuous regulation of the flow. A flowmeter 212 is required to give a visual indication of the flow rate so that an operator can manually adjust the system in response to fluctuations in pressure. In addition to the clogging and resultant pressure problems in the brominator discussed above, fluctuations in the flow rate through the brominator necessarily cause a fluctuation in the delivery rate of the chemical being dissolved and fed through the system. This can result in an undesirable over-treatment or under-treatment of the water supply being managed.

An improved dissolvable product feed apparatus which alleviates the problems of clogging, passage of undissolved product, and fluctuations in chemical delivery rate without the requirement of manual manipulation is desired.

SUMMARY OF THE INVENTION

According to one embodiment of the present invention, a dissolvable product feed apparatus for feeding a dissolvable product comprises a dissolvable product holding vessel and an automatic flow control device fluidly connected to the holding vessel.

According to another embodiment of the present invention, a dissolvable product feed apparatus comprises a dissolvable product holding vessel and means for maintaining a flow velocity below a maximum of approximately 1.36 feet/min in the holding vessel.

DETAILED DESCRIPTION

Figure 1:
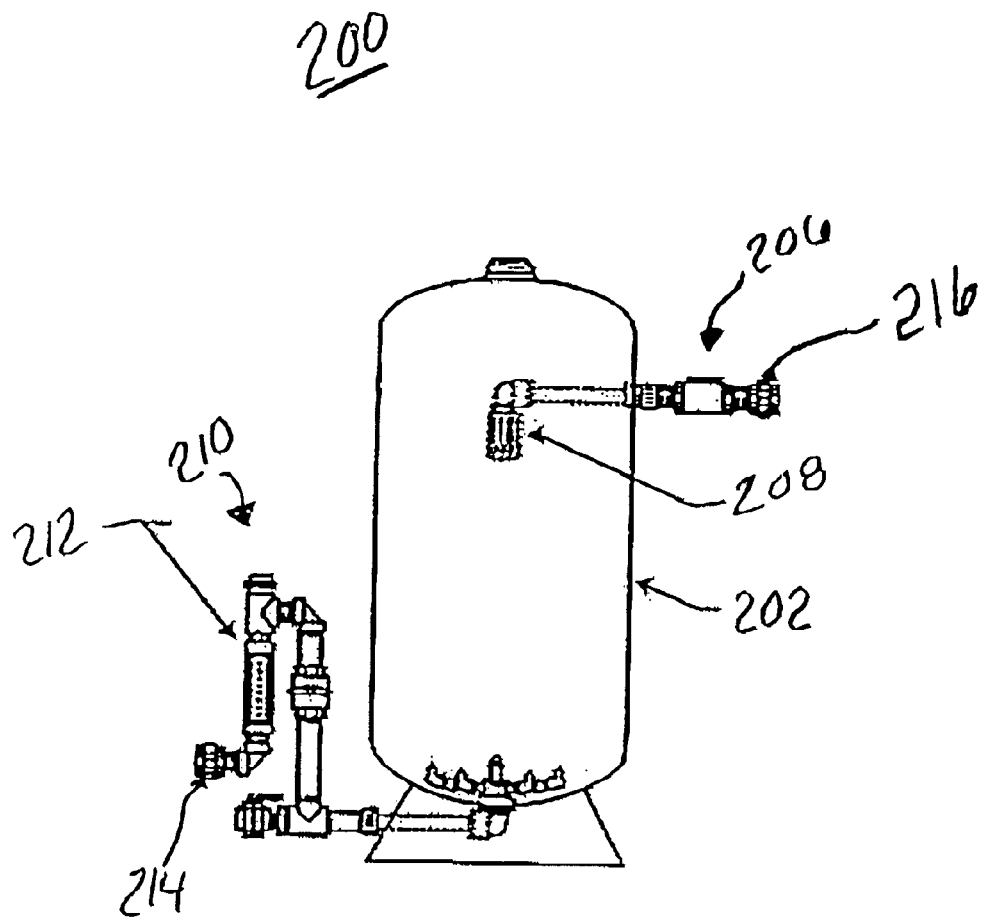
FIG. 1 is a front plan view of a prior art dissolvable product feed apparatus.
Figure 2:
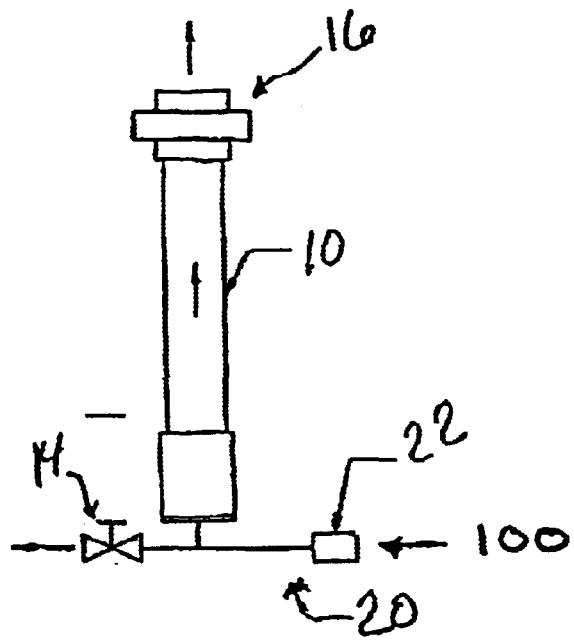
FIG. 2 is a front schematic view of one embodiment of a dissolvable product feed apparatus according to the present invention.

FIG. 2 shows a dissolvable product feeding apparatus 10 according to one exemplary embodiment of the present invention. The apparatus 10 is especially useful for feeding materials such as brominated hydantoin for water treatment applications, but may be used in any application wherein dissolvable products are contained, dissolved and fed through a system.

Figure 3:
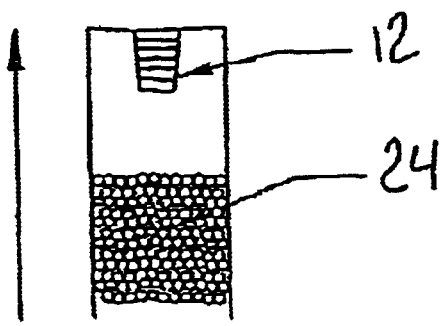
FIG. 3 is a partial cross-sectional view of the dissolvable product feed apparatus of FIG. 1.

Referring to FIGS. 2 and 3, apparatus 10 comprises a dissolvable product holding vessel 10, a diffuser (or screen) 12, a drain 14, an outlet (or discharge) system 16, and an inlet system 20. In operation, apparatus 10 would contain a dissolvable product 24, such as granules or pellets. The arrows in FIGS. 2 and 3 show the direction of flow of a solvent (or fluid, generally water) through the apparatus. Preferably, the holding vessel 10 is transparent or clear so that the solvent or fluid level in the holding vessel is readily detectable, and also allows for marking lines to be placed on the vessel.

Inlet system 20 (e.g., an inlet water supply line) includes a flow control device 22. Preferably, the flow control device controls the flow of the solvent automatically, i.e., the flow control device is an automatic flow control device. By"automatically" or"automatic", it is meant that the device does not have to be adjusted manually in order to control the flow. Examples of non-automatic flow control devices would include such devices as needle valves, ball valves or globe valves, as each of these requires them to be manually adjusted.

Although it is preferred that the flow control device is included in the inlet system for safety reasons, the flow control device may also be included in the outlet or discharge system. Placement of the flow control device in the outlet system is less preferred, however, as problems may arise due to potential back pressure.

Figure 4A:
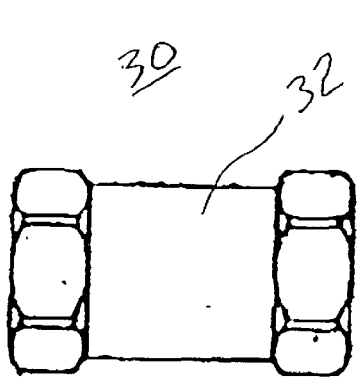
FIG. 4A is a plan view of an automatic flow control device used in accordance with the present invention.
Figures 4B, 4C:
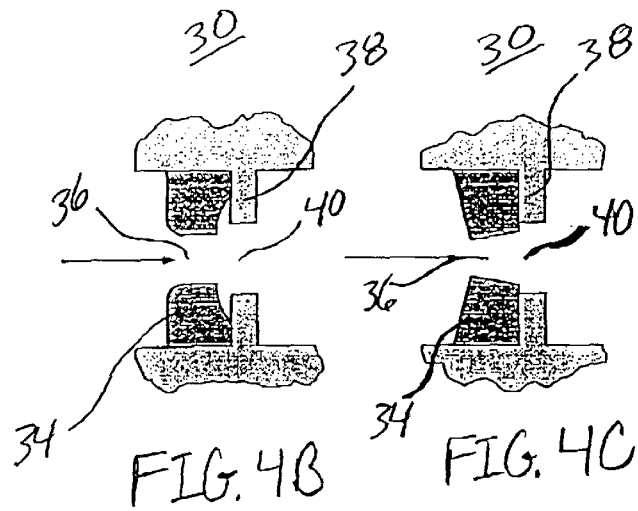
FIG. 4B is a partial cross-sectional view of the automatic flow control device of FIG. 4A indicating the position of the device operating below a threshold pressure for the device.
FIG. 4C is a partial cross-sectional view of the automatic flow control device of FIG. 4A indicating the position of the device operating above a threshold pressure for the device.

One highly preferred automatic flow control device is a Dole® Flow Regulator 30 manufactured by Eaton Corp. of Milwaukee, Ohio. Referring to FIGS. 4A–4C, the regulator 30 comprises a housing 32, a flexible flow restriction element 34 defining a flexible orifice 36, and a fixed flow restriction element 38 defining a fixed orifice 40. The flexible flow restriction element 34 and fixed flow restriction element 38 may contain one or a plurality of respective orifices. The housing 32 is preferably a coupling, as shown in FIG. 4A for connecting to pipes in the inlet system 20.

Advantageously, the flow regulator 30 can deliver a constant volume of water flow output (or constant flow velocity) over a wide pressure differential. Referring to FIGS. 4B and 4C, the flexible orifice 36 will vary its effective area inversely to pressure applied to the flexible flow restriction element 34.

Referring to Graph 1, below, a flow rate vs. pressure curve is shown for a Dole® 2 GPM Flow Regulator. Below a certain threshold pressure, the flexible orifice 36 acts as a fixed orifice (see FIG. 4B). Above the threshold point, the flexible orifice 36 begins to distort, reducing the orifice area (see FIG. 4C), and thereby substantially maintaining a desired constant flow rate. Using this regulator 30, preferably the flow rates will be maintained to within ±15% of a certain desired flow rate between a pressure range of about 15 to 125 psi.

lated product causes water hammer or over-pressurization) the inclusion of an automatic flow control device, such as the Dole® Flow Regulator, in the dissolvable product feeding apparatus may negate the need for a pressure relief valve. However, where the discharge of apparatus has back pressure due to an obstruction or injection into a pressurized system, then use of a relief valve may still be needed.

Although a Dole® Flow Regulator is a preferred flow control device, other flow control devices may be employed in the dissolvable product feeding apparatus of the present

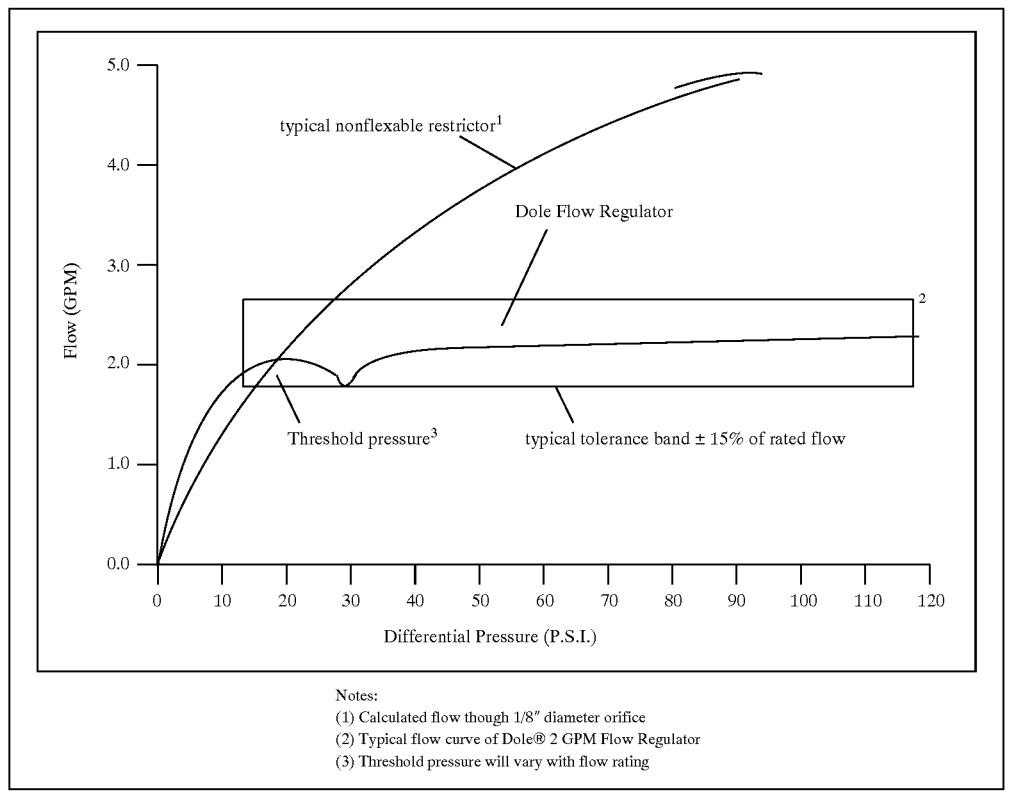

Graph 1
Flow Rate Curve for Dole® 2 GPM Flow Regulator

Notes:
(1) Calculated flow though 1/8″ diameter orifice
(2) Typical flow curve of Dole® 2 GPM Flow Regulator
(3) Threshold pressure will vary with flow rating The inventors have discovered that the maximum fluid flow velocity to avoid floating of a dissolvable product, such as bromochlorodimethylhydantoin (BCDMH), in the holding vessel of a dissolvable product feeding apparatus is approximately 1.36 feet/min through the holding vessel (or dissolvable product bed). For example, in a Mini-Brominator (SHF), manufactured by GE Betz of Trevose, Pa., having a 3 inch diameter inlet pipe, one foot of pipe will hold 0.3672 gallons of water. At a velocity of 1.36 feet/min, this translates to a flow velocity of approximately 0.5 gallons per minute in the 3 inch diameter pipe. Use of a 0.5 GPM Dole® Flow Regulator allows the flow rate or flow velocity to be kept below the maximum (1.36 feet/min) and within about ±15% of 0.5 gallons per minute even given a large pressure differential (ΔP of 15 to 125 psi), thereby leading to avoidance of floating of the product in the holding vessel, as well as providing a more consistent chemical delivery rate.

Under some circumstances (such as where restrictions caused by clogging of the screen or diffuser by the granuinvention. For example, the automatic flow control devices disclosed in U.S. Pat. No. 5,855,355 to Grunert et al. and U.S. Pat. No. 3,752,183 to Griswold, which are incorporated herein by reference, could be employed in the dissolvable product feeding apparatus of the present invention. Further, other automatic flow devices employing a feedback loop (e.g., an actuated throttling device coupled to a flow meter and controlled by a processor) may also be used.

What is claimed is:

1. A dissolvable product feed apparatus comprising:
   holding vessel for receiving a dissolvable product and a solvent, the holding vessel having a diffuser screen, and
   an automatic flow control device fluidly connected to the holding vessel, the automatic flow control device supplying a substantially constant volume of solvent to the holding vessel.

2. The apparatus of claim 1, wherein the automatic flow control device is included in an inlet system.

3. The apparatus of claim 1, wherein the automatic flow control device comprises a flexible flow restriction element having a flexible orifice and a fixed flow restriction element having a fixed orifice.

4. The apparatus of claim 3, wherein the flexible flow restriction element is comprised of a neoprene rubber material.

5. The apparatus of claim 3, wherein the flexible orifice varies its effective area inversely to a pressure applied to the flexible flow restriction element.

6. The apparatus of claim 1, wherein the automatic flow control device minimizes floating of a dissolvable product in the holding vessel.

7. A dissolvable product feed apparatus comprising:

a dissolvable product holding vessel coupled to an automatic flow control device for supplying a substantially uniform volume of a fluid to the holding vessel, and wherein the flow control device regulates flow velocity to below of approximately 1.36 feet/min.

8. The apparatus of claim 7, wherein said means is a flow control device capable of maintaining within ±15% a substantially constant flow velocity of a fluid over a pressure differential in the range of about 15 to 125 psi.

* * * * *